Nov. 3, 1964     D. E. DUNSTER ETAL     3,155,451
OPTICAL CORRELATING METHOD AND APPARATUS USING
TEMPORARY RECORDING TECHNIQUES
Filed Nov. 15, 1962
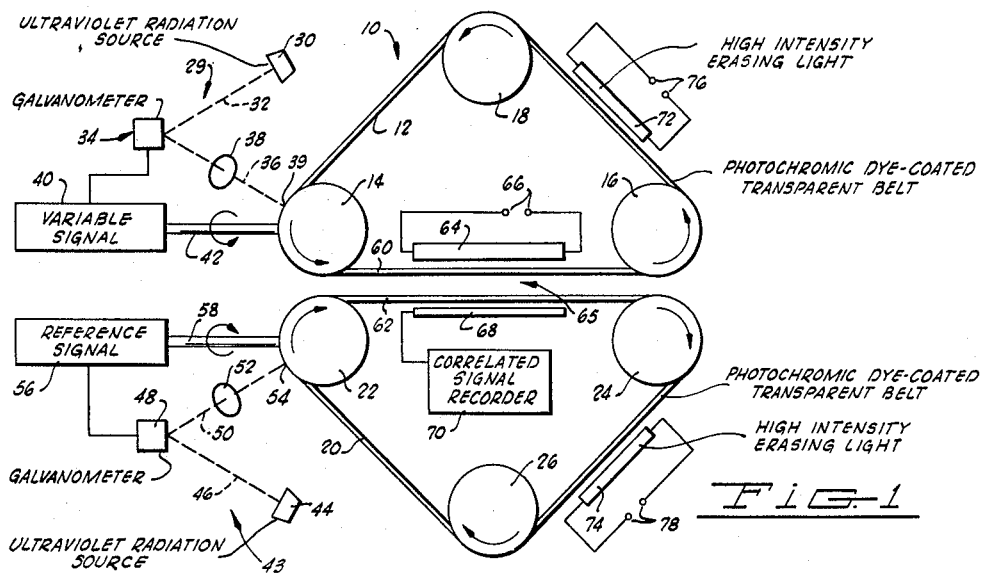
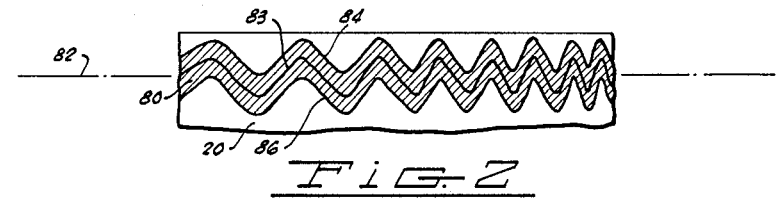
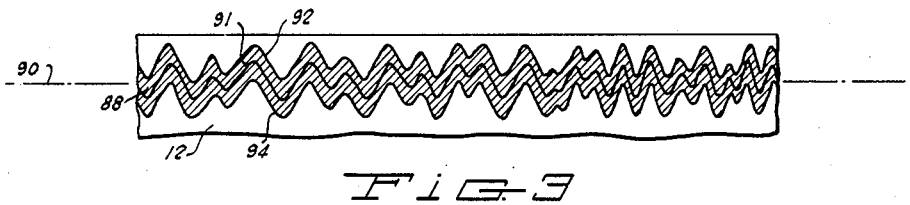
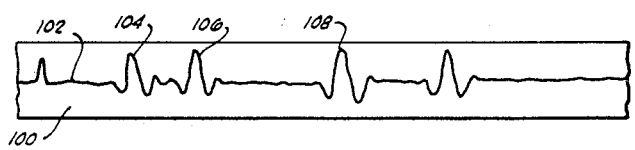
INVENTORS
DONALD E. DUNSTER,
JIMMY RAY COLE &
BY    BOBBY J. THOMAS
ATTORNEY

United States Patent Office 3,155,451
Patented Nov. 3, 1964

3,155,451
OPTICAL CORRELATING METHOD AND APPARATUS USING TEMPORARY RECORDING TECHNIQUES
Donald E. Dunster, Jimmy Ray Cole, and Bobby J. Thomas, Ponca City, Okla., assignors to Continental Oil Company, Ponca City, Okla., a corporation of Delaware
Filed Nov. 15, 1962, Ser. No. 237,838
10 Claims. (Cl. 346—1)

The present invention relates generally to improvements in the art of determining the coincidence between two signals, and more particularly but not by way of limitation, relates to the art of determining the various travel times required for a signal transmitted into the earth from one point to be reflected from various subterranean interfaces and return to a second point.

Copending U.S. patent application Serial Number 812,289 entitled "Method of Determining Time-Phase Coincidence Between Signals," filed May 11, 1959, describes method and apparatus for correlating a received and recorded seismographic signal with the signal originally transmitted in order to determine the time required for the transmitted signal to travel down to the various reflecting interfaces and back to the surface. The transmitted signal in this type of seismic exploration has a controlled frequency content of several seconds duration and is at a relatively low energy level. The most common signal transmitted varies uniformly from a frequency of 90 c.p.s. down to 15 c.p.s. and each signal pulse is referred to as a sweep. When a relatively long duration sweep signal is transmitted into the earth, the received and recorded signal is a product of the sweep signal as it is reflected from the many subterranean interfaces. Since the sweep signal endures longer than the time required to travel to and from the various interfaces, the reflected sweeps are not distinctly separated along the time axis of the recorded signal, but instead overlap with corresponding nulling and reinforcing as the reflections are received and recorded simultaneously. Accordingly, a very complex record or seismogram is produced. The problem of determining the travel times to each of the reflecting interfaces and back to the surface then becomes equivalent to determining the time points of maximum coincidence between the transmitted signal and the complex received signal. This technique is known in the art as correlation.

In the above referenced application, a method of optically correlating the received and recorded signal with the transmitted signal is disclosed. Generally speaking, the transmitted signal is recorded on a transparent film in the form of a relatively opaque sinusoidal trace having a width equal to one-half of the peak-to-peak amplitude of the signal and in which the center of the opaque trace is representative of the magnitude of the signal at any particular point along the time axis. The received signal is similarly recorded on a second length of transparent film. The transparent film, it will be appreciated, is merely a conventional photographic negative produced by projecting a beam of light onto a roll of film moving at a uniform rate. The two film strips are then superimposed with the time axes of the traces aligned. Light is projected through the superimposed film strips and the intensity of the light passing through the films is recorded by one or more photocells or similar light sensitive devices. One of the film strips, usually the complex reflected record, is then moved relative to the other film strip, and the intensity of the light passing through the two superimposed film strips will be a direct measure of the degree of coincidence between the two traces at any point along the time axis, the coincidence being greatest when the intensity of the light is greatest.

A normal seismic survey of a locality will require a very large number of traces made in the field, usually by magnetic tape or other similar recording device. The signal recorded in this manner must then be reproduced on the film strips by a photographic machine. In order to save time and reduce the expense, ten seismic traces are usually recorded simultaneously on a single strip of film 8 inches wide and approximately 66 inches long. The film strips are permanent in nature even though they will customarily be used but one time, and then for only a relatively brief period. Therefore, it will readily be appreciated that the total expense of the machines, labor and material for reproducing the seismic records on the film strips represents a substantial sum.

Therefore, it is contemplated by the present invention to provide a more economical method and apparatus for optically correlating a pair of signals. This is accomplished by recording at least one of the signals on a transparent, bistable recording medium, such as a strip of Mylar film coated with photochromic dye. The bistable recording medium is essentially transparent until exposed to a source of ultraviolet light which changes the bistable recording medium to an essentially opaque color. The bistable recording medium will then remain opaque until exposed to a substantial quantity of white light and can be exposed for several minutes in ordinary room light without appreciable loss of its opaque quality. The signal thus recorded is therefore sufficiently permanent to permit correlation which can be accomplished in only a few seconds. After correlation of the signals, the bistable recording medium can be quickly changed back to transparent by exposure to a high intensity white light and is then ready for recordation of another signal or set of signals.

It is therefore an important object of the present invention to provide an improved method and apparatus for correlating two signals which save time and are relatively inexpensive.

Another object of the present invention is to provide a method and apparatus for optically correlating a pair of signals without making any permanent photographic records of the signals.

Still another important object of the present invention is to provide method and apparatus for optically correlating a pair of signals directly from magnetic tape records without an intermediate step of preparing photographic records.

Many additional objects and advantages of the present invention will be evident to those skilled in the art from the following detailed description and drawings, wherein:

FIG. 1 is a somewhat schematic drawing of an apparatus constructed in accordance with the present invention, the drawing also serving to illustrate the method of the present invention;

FIG. 2 is a somewhat schematic illustration of a portion of a photographic record of a reference signal prepared in accordance with the present invention;

FIG. 3 is a somewhat schematic illustration of a record of a reflected and recorded signal prepared in accordance with the present invention and which may be correlated with the record of FIG. 2; and, FIG. 4 is a schematic illustration of a typical record produced by correlation of the records of FIGS. 2 and 3 in accordance with the present invention.

Referring now to the drawings, and in particular to FIG. 1, a correlating apparatus constructed in accordance with the present invention is indicated generally by the reference numeral 10. The correlating apparatus 10 comprises a first endless record belt 12 which passes around three guide rollers 14, 16 and 18. A second record belt 20 passes around three other guide rollers 22, 24 and 26. Each of the record belts 12 and 20 has a bistable color characteristic, one being transparent and the other a color which is essentially opaque. The belts further have the characteristic of being transparent until exposed to one type of radiation and then turning to the opaque color. The record belts then remain opaque until exposed to another type of radiation, at which time the record belts change back to transparent. It is also highly preferable that the record belts 12 and 20 be easily and quickly changed to the opaque color by the first type of radiation, but then require a somewhat greater radiation dosage, either through an extended period of time or through a higher intensity source, to revert back to the transparent condition.

One highly suitable type of bistable record belt which may be utilized comprises a belt of transparent Mylar film coated with a photochromic dye. The photochromic dye may be applied in any convenient and suitable manner known in the art, and changes from a clear or transparent state to a colored, relatively opaque condition when exposed to ultraviolet light. The photochromic dye can be changed back to the transparent state by exposing it to a high intensity white light. The persistency of the opaque color is such that when the dye is exposed to light of normal room intensity, the opaque color will be retained for several minutes. Of course, photochromic dyes are commercially available which have various colors and various persistencies, and the most desirable dyes for a particular application may now be selected by those skilled in the art.

A first recording means, indicated generally by the reference numeral 29, is comprised of an ultraviolet radiation source 30, so positioned as to direct a beam of ultraviolet light 32 onto the mirror of a conventional galvanometer 34. A beam of ultraviolet light 36 is reflected from the mirror of the galvanometer 34 onto the bistable record belt 12. A suitable lens system, represented schematically by the lens 38, may be provided to focus the beam 36 in order to record a trace of proper width on the belt 12, as hereafter described in greater detail. The galvanometer 34 is connected to receive a first, variable signal from a suitable source such as a magnetic playback device 40. The galvanometer 34 is operated by the variable signal from the playback device 40 in the conventional manner such that the focused ultraviolet light beam 36 is deflected from a center position on the record belt 12 a direction and distance representative of the instantaneous polarity and magnitude of the signal. The record belt 12 is driven in synchronism with the playback device 40 by any suitable means as represented by the shaft 42. Therefore, as the record belt 12 is synchronously driven past the recordation point 39, the signal reproduced by the playback device 40 will operate the galvanometer 34 and cause deflection of the ultraviolet light beam 36 and thereby reproduce the variable signal on the bistable record belt 12 as the photochromic dye is changed from transparent to an opaque color by impingement of the ultraviolet light beam 36.

A second, similar recording means, indicated generally by the reference numeral 43, is provided for recording a second signal on the bistable record belt 20 and includes a source of ultraviolet radiation 44 which directs an ultraviolet light beam 46 onto the mirror of a galvanometer 48 from which an ultraviolet light beam 50 is reflected through a lens system 52 onto the surface of the record belt 20 at recordation point 54. The galvanometer 48 is operated by a second signal reproduced by a second playback device 56 and the record belt 20 is driven in synchronism with the playback device 56 by any suitable means as represented by the shaft 58. Therefore, the second signal, which is preferably the reference or original signal transmitted into the ground and which usually comprises a uniform sweep from 90 c.p.s. down to 15 c.p.s., may be recorded by the ultraviolet light beam 50 on the bistable record belt 20 as the record belt moves past the recordation point 54.

The bistable record belts 12 and 20 have portions 60 and 62, respectively, which are in very close, parallel relationship such that the two record traces made by the ultraviolet beams 36 and 50 are in effect superimposed one upon the other. A suitable source 64 of relatively low intensity white light, such as a conventional fluorescent bulb, is disposed adjacent one side of the superimposed record belts at what may be conveniently termed a correlation station 65, and is energized by a suitable power source which may be connected to the terminals 66. Light from the fluorescent bulb 64 passes through the portions 60 and 62 of the superimposed belts 12 and 20 and strikes a suitable light intensity sensing unit 68, which may conveniently be a photoelectric cell. The low intensity light source 64 should be such as to project light evenly over the entire length of one of the record traces, usually the sweep signal trace, and the light sensing unit 68 should also be capable of measuring all light passing through this length of the record belts. The output from the light sensing unit 68 is then a direct measure of the correlation between the two signals recorded on the bistable record belts 12 and 20, as hereafter described in greater detail, and this output may be recorded by a suitable recorder 70.

Two high intensity light sources 72 and 74, of any suitable type, are disposed adjacent the record belts 12 and 20. The high intensity light sources may be energized by conventional electrical power connected to the leads 76 and 78, respectively. The high intensity light sources are disposed at points along the paths of travel of the record belts 12 and 20 such that the high intensity light may be utilized to erase the record traces recorded on the belts after the two signals temporarily recorded have been correlated. The high intensity light sources 72 and 74 transform the opaque color of the bistable record belts back to the transparent state in preparation for the recordation of new signals and a repeat of the correlation process. It will be appreciated by those skilled in the art that the high intensity lights should be suitably shielded from the record belts 12 and 20 between the recordation points 39 and 54 and the end of the correlation station 65. It will also be appreciated that suitable controls should be provided, either manual or automatic, for controlling the individual or concerted operation of all the separate components described above, as will be obvious to those skilled in the art.

The operation of the correlating apparatus 10, as well as the method of recording signal traces and of correlation in accordance with the present invention, will best be understood from a description of the manner in which a seismic sweep signal transmitted into the ground at one point is correlated with the composite signal recorded at another point in order to produce a time phase coincidence record. The coincidence record is then an accurate record of the travel time required for the transmitted signal to travel down to a particular subterranean interface and be reflected back to the point of recordation at the surface.

A portion of a typical sweep signal record trace made on the record belt 20 is illustrated in FIG. 2. The signal is recorded on an elongated trace 80 having a time scale extending longitudinally of an imaginary center line 82. The reference or sweep signal has a controlled frequency content, which as previously mentioned is customarily a uniform sweep from a high frequency of 90 cps. down to a low frequency of 15 cps., and should have a constant amplitude. Further, it will be noted that the trace 80 has a constant transverse width, which is a result of the focusing lens 52, and the width is preferably equal to or slightly greater than the maximum amplitude or excursion of the trace 80 from the center line 82. Therefore, it will be noted that the center 83 of the constant width trace 80 is representative of the amplitude of the recorded signal and that the lateral boundaries 84 and 86 do not cross the imaginary center line 82.

FIG. 3 is an illustration of a typical complex seismic signal which is preferably recorded on the record belt 12 by the ultraviolet light beam 36. The complex signal is recorded as an opaque, elongated trace 88 having a constant width corresponding to the width of the trace 80 and a comparable amplitude. It will be noted that the complex signal appears to be completely random as a result of the overlapping reflections of the relatively long duration sweep signal which was transmitted into the ground. The trace 88 also has an imaginary center line 90 such that the lateral excursion of the center 91 of the trace from the imaginary center line 90 is representative of the instantaneous amplitude of the signal. Also, it is preferred that the width of trace be such that the lateral boundaries 92 and 94 do not cross the center line 90.

As previously mentioned, the traces 80 and 88 are recorded on the record belts 20 and 12, respectively, in such positions that upon passing around the rollers 14 and 22, the center lines 82 and 90 will be aligned in the zone of the correlation station. It should be pointed out that by duplication of the recording means 29 and 43, any number of parallel traces may be made on the record belts 12 and 20, one standard and desirable practice being to simultaneously produce ten separate traces for ten signals recorded at ten separate recordation points on the surface of the earth. The recorder 70 may be any suitable type, but preferably produces an elongated record 100 having the correlation signal represented by an ink trace 102 as schematically illustrated in FIG. 4. Each time that the reference trace 80 coincides with a portion of the complex trace 88, as will presently be described in greater detail, the light passing through the superimposed traces will reach maximum intensity as represented by the pips 104, 106 and 108, for example. Each pip is then representative of the precise time required for the propagated sweep signal to travel downwardly to an interface and be reflected upwardly to the sensing seismometers.

In order to correlate the sweep signal with the complex received signal, the sweep signal is first recorded as the trace 80 on the record belt 20 by the ultraviolet recording means 43. The record belt 20 is then moved until the trace 80 is at the correlation station and disposed over the light sensing unit 68. As previously mentioned, the light sensing unit should be capable of measuring all light passing through the sweep signal trace 80. The sweep signal trace 80 is then maintained stationary over the photo electric cell 68 throughout the remainder of the correlation process for each particular complex signal trace 88.

Next the ultraviolet recording means 29 is actuated, the belt 12 is started moving, the correlated signal recorder 70 placed in operation and the fluorescent bulb 64 energized. As the belt 12 moves past the recordation point 39, the complex signal trace 88 will be recorded on the belt. Then as the recorded trace 88 moves past the correlation station 65 the total quantity of light passing through the superimposed traces 80 and 88 and impinging upon the light sensing unit will be converted to an electric signal having a magnitude proportional to the intensity of the white light impinging the sensing unit, and this signal will be recorded by the recorder 70. As the record belt 12 is moved over the record belt 20, each time that the complex trace 88 has maximum coincidence with the sweep signal trace 80 as a result of phase alignment, the quantity of light striking the photoelectric cell 68 will rise quickly to a maximum which will be recorded as the trace 102 by the recorder 70. As the belt 12 passes around the roller 16, the high intensity light source 72 will then erase the trace 88 and restore the record belt 12 to an essentially transparent state preparatory to the recordation of additional signals thereon.

Since the persistency of the opaque trace 80 is preferably such as to be relatively quickly erasable by a high intensity source 74, the persistency of the trace under a low intensity light source 64 will in all probability not exceed a few minutes. Accordingly, it is desirable to record a new sweep signal trace 80 on the record belt 20 prior to recordation and correlation of each complex signal. This is done merely by actuating the ultraviolet recording means 43 which automatically starts the belt drive and moves an unexposed, transparent portion of the record belt 20 past the recordation point 54. At the same time, the previously exposed portion of the belt 20 will be moved past the high intensity light source 74 which will in effect erase the opaque trace and convert the record belt 20 back to the transparent state.

It will be appreciated by those skilled in the art that the method and apparatus herein described and illustrated may be utilized to determine the degree of coincidence between any two signals, which would include many fields of endeavor other than seismographic surveying. Therefore, the capability to temporarily record both of the signals to be correlated on a reuseable record medium in a direct and economical manner is highly desirable. Further, even in seismographic surveying work it is sometimes difficult to transmit a seismic sweep signal of precisely controlled frequency content into the earth. This is due to variations in the spring constant and nature of the earth at the particular point where the seismic sweep signal is being generated which cause the sweep signal actually induced in the earth at each point of transmittal to differ to some extent from the ideal electrical reference sweep signal produced by an oscillator circuit. Thus the actual signal transmitted into the earth may be recorded by seismometers placed in very close proximity to the seismic wave generators, or on the seismic wave generator itself, and the sweep signal actually transmitted at each point correlated with the reflected complex signal. Therefore, the method and apparatus described above provides a practical and economical means for correlating the precise sweep signal induced in the earth with the reflected complex signal.

On the other hand, in many cases the sweep signal actually transmitted into the earth so closely approximates the ideal reference sweep signal generated by the control oscillator circuit that no significant error will be induced into the correlation process. In such a case, it may be preferable to record the sweep signal trace 80 permanently on a conventional photographic transparency, a plate of glass or other rigid recording medium and to fix the record medium in position with the permanent sweep signal traces disposed over the light sensing unit 68. Then the complex signals can be very rapidly recorded on the belt 12 by the ultraviolet recording means 29, correlated with the sweep signal trace as the complex signal trace passes the correlation station 65, and erased as the complex signal trace passes the high intensity erasing light source 72.

Although as herein described the various signals to be correlated are recorded as constant width, opaque traces having lateral excursions from an imaginary center line which are representative of the magnitude and polarity of the signal, it will be noted that the traces 80 and 88 may be broadly defined as having an instantaneous degree of opaqueness to either side of the imaginary center line which is representative of the magnitude of the signal. Accordingly, it is to be understood that in its broader aspects the present invention is intended to include any technique of recording the signals with respect to time wherein the instantaneous or unit degree of opaqueness along the time axis is representative of the instantaneous or unit value of the signal. For example, the signals may be recorded as a full width trace having varying degrees of opaqueness from transparent to solid opaque representative of the magnitude of the signal. Or the signal may be recorded as a solid opaque signal having a varying width which is always centered on the imaginary center line extending along the time axis. This type of trace then gives the appearance of a straight line having a varying width. Various other techniques of expressing a signal with respect to time as a function of opaqueness which can readily be utilized in practicing the present invention will be evident to those skilled in the art.

Although specific embodiments of the present invention have been described in detail, it is to be understood that various changes, substitutions and alterations can be made therein without departing from the spirit and scope of the present invention as defined by the appended claims.

What is claimed is:

1. A method for determining the degree of coincidence between first and second signals comprising the steps of:
   recording the first signal on a bistable recording medium by a beam of one type of radiation as an elongated first trace having a longitudinal time scale, the unit degree of opaqueness of the first trace being representative of the amplitude of the first signal;
   recording the second signal on a second recording medium, the second signal being recorded as a second elongated trace having a longitudinal time scale, the unit degree of opaqueness of the second trace being representative of the amplitude of the second signal;
   superimposing said recording media with the time scales of the traces in coincidence;
   exposing the recording media to a constant intensity source of radiation, the intensity of the source being such as not to appreciably change the state of the bistable recording medium;
   moving at least one of the recording media in a direction to provide relative longitudinal movement between the traces;
   determining the amount of light passing through the superimposed recording media as a function of the time-phase relation between the traces; and,
   exposing the bistable recording medium to high intensity radiation of another type to erase the traces thereon and prepare the medium for recordation of another trace.

2. A method for determining the degree of coincidence of first and second signals comprising the steps as defined in claim 1 wherein:
   the first and second traces comprise elongated, constant width traces having lateral excursions representative of the value of the respective signals.

3. A method for determining the degree of coincidence between first and second signals comprising the steps of:
   recording each signal as an elongated trace having a longitudinally extending time scale on a bistable recording medium by a beam of one type of radiation, the unit degree of opaqueness along the time scale of each said trace being representative of the amplitude of the respective signal;
   superimposing the recording media with the respective time scales of the traces in coincidence;
   exposing the recording media to constant intensity radiation of a second type, the intensity of the radiation being such as not to appreciably change the state of the bistable recording media;
   moving at least one of the recording media in a direction to provide relative movement between the traces along the time scale;
   registering the amount of radiation of the second type passing through the recording media as a function of the time-phase relation between the traces; and,
   exposing the recording media to radiation of the other type to erase the traces recorded thereon whereby the recording media can be used to record other traces.

4. A method for determining the degree of coincidence of first and second signals comprising the steps as defined in claim 3 wherein:
   each of the elongated traces comprises a constant width trace having lateral excursions representative of the value of the respective signals.

5. Apparatus for determining the degree of coincidence between first and second signals, the apparatus comprising:
   at least one bistable recording medium having the property of being changed from a substantially transparent state to a substantially opaque state when exposed to a first type of radiation and of being changed back to the transparent state when exposed to a second type of radiation;
   recording means for projecting one of the types of radiation onto the bistable recording medium for changing the state thereof to form an elongated trace having a longitudinally extending time scale and a unit degree of opaqueness representative of the instantaneous value of one of the signals;
   a second recording medium having a second elongated trace thereon, the trace having a longitudinally extending time scale and a unit degree of opaqueness representative of the instantaneous value of the other of the signals;
   a source of low intensity radiation of the other type;
   radiation sensing means spaced from the source of low intensity radiation for producing a signal representative of the intensity of radiation received from the source of low intensity radiation;
   means for supporting one of the bistable recording media between the source of low intensity radiation and the radiation sensing means;
   means for moving the other of the recording media relative to said one of the recording media such that the traces thereon will be in superimposed relation with the time scales thereon coinciding; and,
   a source of high intensity radiation of said other type for erasing the trace recorded on the bistable recording medium by the recording means after the two signals have been correlated.

6. Apparatus for determining the degree of coincidence between first and second signals as defined in claim 5 wherein:
   the bistable recording medium is an endless belt; and,
   the means for moving one recording medium relative to the other moves the bistable recording medium successively past the recording means, the radiation sensing means and the source of high intensity radiation.

7. Apparatus for determining the degree of coincidence between first and second signals as defined in claim 5 wherein:
   the bistable recording medium is comprised of a transparent member having a coat of photochromic dye thereon, the photochromic dye being essentially transparent until exposed to ultraviolet radiation and then turning esentially opaque, the photochromic dye then remaining essentially opaque until exposed to a substantial quantity of white light, and then returning to an essentially transparent state.

8. Apparatus for determining the degree of coincidence between first and second signals, the apparatus comprising:
   a pair of bistable recording media each having the property of being changed from a substantially transparent state to a substantially opaque state when exposed to a first type of radiation and of being changed back to the transparent state when exposed to a second type of radiation;
   recording means for projecting one of the types of radiation onto each of the bistable recording media for recording the first and second signals on the respective recording media as a pair of elongated traces, each trace having a longitudinally extending time scale and a unit degree of opaqueness representative of the instantaneous value of the respective signals;
   a source of low intensity radiation of the other type;
   radiation sensing means spaced from the source of low intensity radiation for producing a signal representative of the intensity of radiation received from the source of low intensity radiation;
   means for supporting one of the recording media between the source of low intensity radiation and the radiation sensing means;

means for moving the other of the recording media relative to said one of the recording media such that the traces thereon will be in superimposed relation with the time scales thereon coinciding; and, a source of high intensity radiation of said other type for erasing the traces recorded on each of the recording media after the two signals have been correlated.

9. Apparatus for determining the degree of coincidence between first and second signals, the apparatus comprising:

a pair of flexible, endless bistable recording media each having the property of being changed from a substantially transparent state to a substantially opaque state when exposed to a first type of radiation and of being changed back to the transparent state when exposed to a second type of radiation;

means for moveably supporting each of the endless recording media with portions of each in parallel, superimposed relationship;

recording means for projecting one of the types of radiation onto each of the bistable recording media for recording the first and second signals on the respective recording media as a pair of elongated traces, each trace having a longitudinally extending time scale and a unit degree of opaqueness representative of the instantaneous value of the respective signals;

a source of low intensity radiation of the other type disposed on one side of the portions of the recording media in parallel, superimposed relationship for projecting radiation therethrough;

radiation sensing means on the other side of said portions of the recording media for producing a signal representative of the intensity of the radiation from the source which passes through the traces on the superimposed recording media; and, a source of high intensity radiation of said other type for erasing the traces recorded on each of the recording media after the two signals have been correlated by moving one of the traces relative to the other.

10. Apparatus for determining the degree of coincidence between first and second signals, the apparatus comprising:

at least one bistable recording medium having the property of being changed from a substantially transparent state to a substantially opaque state when exposed to a first type of radiation and of being changed back to the transparent state when exposed to a second type of radiation;

recording means for projecting one of the types of radiation onto the bistable recording medium for changing the state thereof to form an elongated trace having a longitudinally extending time scale and a unit degree of opaqueness representative of the instantaneous value of one of the signals;

a second recording medium having a second elongated trace thereon, the trace having a longitudinally extending time scale and a unit degree of opaqueness representative of the instantaneous value of the other of the signals;

a source of low intensity radiation of the other type;

radiation sensing means spaced from the source of low intensity radiation for producing a signal representative of the intensity of radiation received from the source of low intensity radiation;

means for supporting the second recording medium between the source of low intensity radiation and the radiation sensing means;

means for moving the first recording medium relative to the second recording medium such that the traces thereon will be in superimposed relation with the time scales thereon coinciding; and, a source of high intensity radiation of said other type for erasing the trace recorded on the bistable recording medium by the recording means after the two signals have been correlated.

No references cited: